US012643345B2

(12) United States Patent
Hird

(10) Patent No.: US 12,643,345 B2
(45) Date of Patent: Jun. 2, 2026

(54) NON-PNEUMATIC TIRES FOR IN-FIELD IRRIGATION SYSTEMS

(71) Applicant: 1434882 Alberta Ltd., Winnipeg (CA)

(72) Inventor: Derek Hird, Winnipeg (CA)

(73) Assignee: 1434882 Alberta Ltd, Winnipeg (CA)

( * ) Notice: Subject to any disclaimer, the term of this patent is extended or adjusted under 35 U.S.C. 154(b) by 0 days.

(21) Appl. No.: 18/691,692

(22) PCT Filed: Jul. 26, 2022

(86) PCT No.: PCT/CA2022/051150
§ 371 (c)(1),
(2) Date: Mar. 13, 2024

(87) PCT Pub. No.: WO2023/065009
PCT Pub. Date: Apr. 27, 2023

(65) Prior Publication Data
US 2024/0383280 A1      Nov. 21, 2024

Related U.S. Application Data

(60) Provisional application No. 63/270,334, filed on Oct. 21, 2021.

(51) Int. Cl.
*B60C 7/10*          (2006.01)
*B60C 11/03*         (2006.01)
(Continued)

(52) U.S. Cl.
CPC .......... *B60C 7/107* (2021.08); *B60C 11/0311* (2013.01); *B60C 7/26* (2013.01); *B60C 2200/08* (2013.01)

(58) Field of Classification Search
CPC ............. B60C 11/0311; B60C 11/0316; B60C 2011/0313; B60C 7/107
See application file for complete search history.

(56) References Cited

U.S. PATENT DOCUMENTS

| | | | | |
|---|---|---|---|---|
| 876,597 | A | * | 1/1908 | Seiberling ............... B60C 7/107 |
| | | | | 152/393 |
| 3,163,199 | A | | 12/1964 | Straussler et al. |

(Continued)

FOREIGN PATENT DOCUMENTS

| | | |
|---|---|---|
| CN | 2181418 | 11/1994 |
| CN | 210390645 | 8/2019 |

(Continued)

OTHER PUBLICATIONS

English machine translation of CN110217051A. (Year: 2019).*

(Continued)

*Primary Examiner* — Robert C Dye
(74) *Attorney, Agent, or Firm* — Kyle R Satterthwaite; Ryan W Dupuis; Ade & Company Inc.

(57) ABSTRACT

A non-pneumatic tire for a wheeled tower of an in-field irrigation system has a circular array of hollow cavities within the tire body. In cross-sectional planes lying normally of the rotational axis, each cavity has a circumferentially elongated cross-section of greater circumferential length than radial width. Bulbous and concavely rounded terminuses of each cavity impart a dumbbell shaped cavity profile that omits stress failure points. The cavity width tapers in an axially inward direction toward a midplane of the tire, where the cavity width is narrowest. In use, collapse of the cavity at its narrow midpoint squeezes accumulate mud out from the cavities in self-cleaning fashion. The outer circumference of the tire features sloped areas whose axial measure decreases toward the midplane. In use of the tire, the sloped areas draw mud inwardly toward the midplane and self-fill the ground beneath the tire, and thereby lessening overall rut formation.

21 Claims, 5 Drawing Sheets

(51) Int. Cl.
　　*B60C 11/13*　　　(2006.01)
　　*B60C 7/26*　　　(2006.01)

(56)　　　　　References Cited

U.S. PATENT DOCUMENTS

| | | | | |
|---|---|---|---|---|
| 3,467,159 | A * | 9/1969 | Semonin | B60C 11/0316 |
| | | | | 152/209.12 |
| 5,046,785 | A * | 9/1991 | Bockerman | B60B 15/025 |
| | | | | 301/43 |
| 5,078,454 | A * | 1/1992 | Rollinson | B60C 7/08 |
| | | | | 305/191 |
| 5,810,452 | A | 9/1998 | Hawthorne et al. | |
| 6,616,374 | B2 | 9/2003 | Starr | |
| 7,946,658 | B2 | 5/2011 | Lanser | |
| 9,381,773 | B2 | 7/2016 | Seljan | |
| 9,586,443 | B2 | 3/2017 | MacPherson | |
| 10,099,508 | B2 | 10/2018 | Labuschagne | |
| 10,399,382 | B2 * | 9/2019 | Welsh | B60B 15/02 |
| 10,440,873 | B2 | 10/2019 | Phely | |
| 10,933,687 | B1 | 3/2021 | Patrick et al. | |
| 12,043,059 | B2 | 7/2024 | Mesinovic et al. | |
| 2009/0084478 | A1 * | 4/2009 | Wallet | B60C 11/1307 |
| | | | | 152/209.13 |
| 2014/0062172 | A1 | 3/2014 | Martin et al. | |
| 2014/0083585 | A1 * | 3/2014 | Korus | B60C 7/22 |
| | | | | 152/246 |
| 2014/0305561 | A1 | 10/2014 | Phely | |
| 2018/0361799 | A1 | 12/2018 | Hird | |
| 2019/0248189 | A1 | 8/2019 | Vautard et al. | |
| 2020/0062040 | A1 * | 2/2020 | Rooney | B60C 11/0083 |

FOREIGN PATENT DOCUMENTS

| | | | | | | |
|---|---|---|---|---|---|---|
| CN | 110217051 | A | * | 9/2019 | | B60C 7/10 |
| CN | 110435358 | | | 11/2019 | | |
| KR | 20110067208 | A | * | 6/2011 | | B60C 23/18 |
| WO | WO-9523072 | A1 | * | 8/1995 | | B60B 15/021 |
| WO | 95/23072 | | | 11/2019 | | |

OTHER PUBLICATIONS

Tharran Gaines, "Airless Irrigation Pivot Tires", Successful Farming, Apr. 8, 2019, retrieved from the Internet <https://www.agriculture.com/machinery/irrigation-equipment/minnesota-cost-share-programs-helps-upgrade-irrigation-systems>.

* cited by examiner

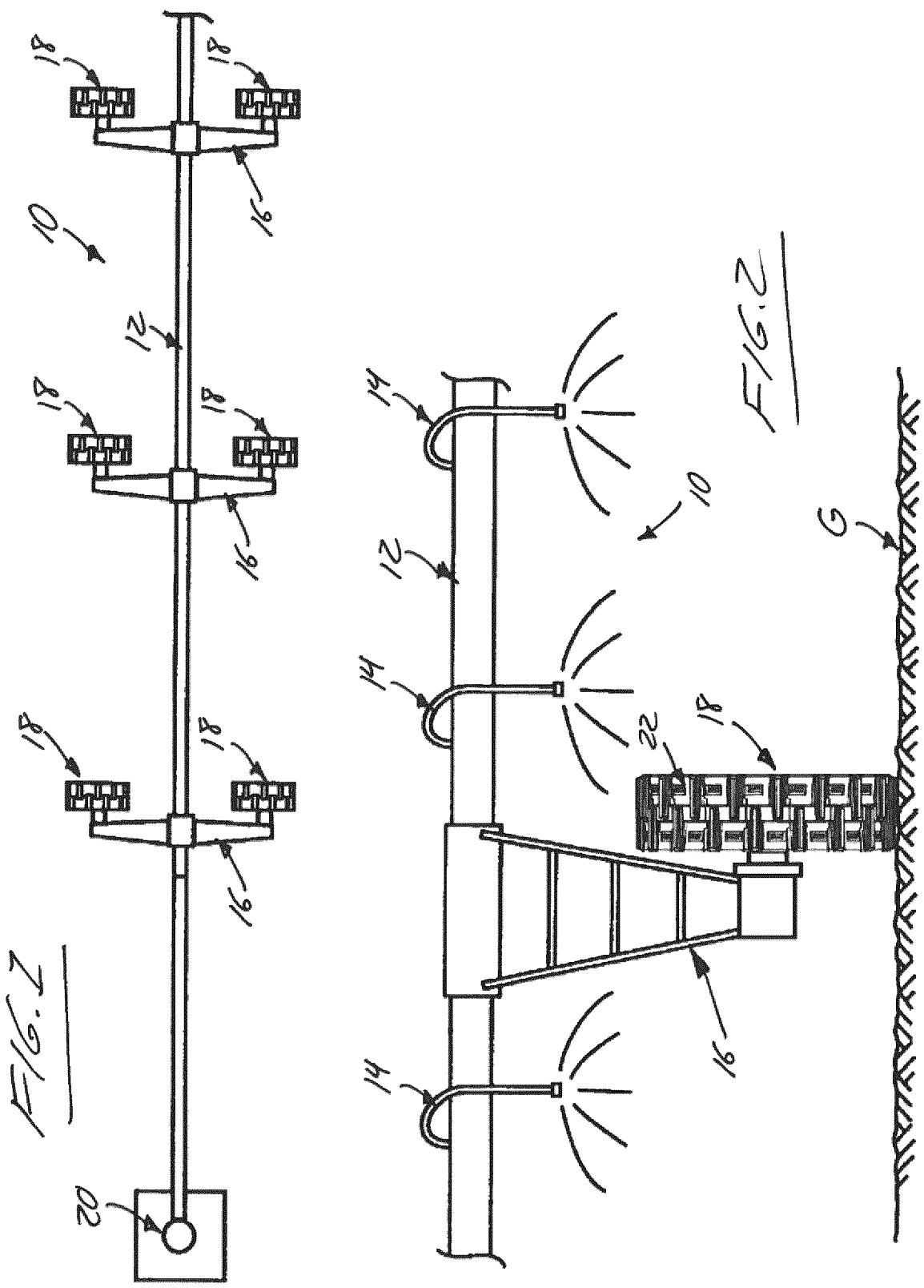

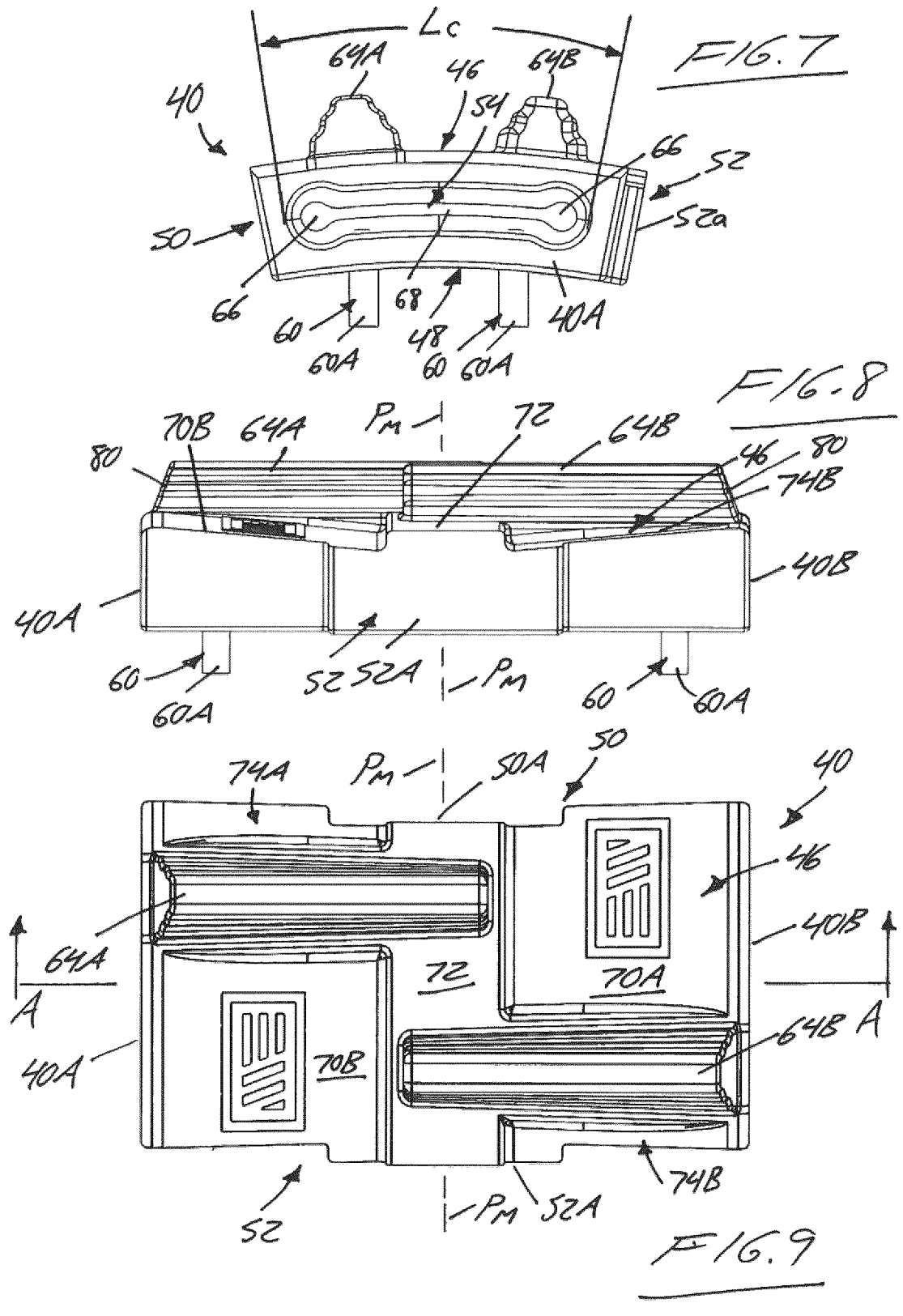

NON-PNEUMATIC TIRES FOR IN-FIELD IRRIGATION SYSTEMS

CROSS-REFERENCE TO RELATED APPLICATIONS

This application claims benefit under U.S. Provisional Application No. 63/270,334, filed Oct. 21, 2021, the entirety of which is incorporated herein by reference.

FIELD OF THE INVENTION

This invention relates generally to self-propelled in-field irrigation systems, and more particularly to tires specifically designed to address known tire complications with such equipment, such as on-tire mud accumulation, and deep rut formation in the field.

BACKGROUND

Self-propelled irrigation systems use towers to support a water supply pipe above ground level at spaced positions along the pipe over a field to be irrigated. These towers feature driven wheels that propel the irrigation system over the field while water is discharged from the supply pipe at spaced locations therealong. Such systems include center pivot systems where the water supply pipe extends radially outward from a stationary center tower such that the drive towers move along concentric circular paths about the center tower, and lateral or linear moving systems where drive towers at opposite ends of the pipe carry operate in a common direction to move it in a linear manner along the field. Conventionally an electric motor carried on each drive tower is connected a pair of drive wheels disposed on opposite sides of the water pipe through a respective pair of gearboxes.

A problem that occurs with conventional self propelled irrigation systems is that their drive towers follow the same path during repeated passes over the field, thereby often leading to the formation of deep wheel tracks or ruts. This can become especially problematic in the context of zero-till or low-till planting practices where the ground is not cultivated or tilled, and the ruts can accordingly grow excessively deep.

One prior solution to this rut formation was proposed in U.S. Pat. No. 7,946,658 by RPH Irrigation Services, Ltd. of Calgary, Alberta Canada, in which a unique configured wheel hub was installed in combination with a conventional tire, and positioned the wheel at an oblique angle, whereby the driven wheel as imparted with an intentional wobble so that the wheel path wonders back and forth relative to a conventionally fixed path of travel, thereby reducing the rut-forming or rut-deepening tendency of the irrigation system.

Nonetheless, there remains room for improved and alternative options to address rut-formation and other complications of wheeled in-field irrigation systems.

SUMMARY OF THE INVENTION

According to a first aspect of the invention, there is provided a non-pneumatic tire usable on a wheeled tower of an in-field irrigation system, said tire comprising:

a resiliently radially-compressible tire body having an outer circumference spanning circumferentially around a central rotational axis on which said tire body is rotatable; and in circumferentially distributed relation to one another around said central rotational axis at a radial distance spaced inwardly from said outer circumference of the tire body, a circular array of hollow cavities disposed within said tire body;

wherein each hollow cavity in said circular array:

in cross-sectional planes lying normally of said central rotational axis, has a circumferentially elongated cross-section featuring a length dimension that is measured in a direction of circumferential relationship to the central rotational axis, and that exceeds a lesser width dimension that is measured in a direction of radial relationship to the central rotational axis.

According to a second aspect of the invention, there is provided a non-pneumatic tire usable on a wheeled tower of an in-field irrigation system, said tire comprising:

a resiliently radially-compressible tire body having an outer circumference spanning circumferentially around a central rotational axis on which said tire body is rotatable; and in circumferentially distributed relation to one another around said central rotational axis at a radial distance spaced inwardly from said outer circumference of the tire body, a circular array of hollow cavities disposed within said tire body;

wherein:

in cross-sectional planes lying normally of said central rotational axis, each hollow cavity has a cross-section featuring a length dimension that is measured in a direction of circumferential relationship to the central rotational axis, and a width dimension that is measured in a direction of radial relationship to the central rotational axis;

each hollow cavity penetrates fully through the tire body in an axial direction of parallel relationship to the central rotational axis, and the width dimension of each hollow cavity is tapered in an axially inward direction toward a midplane of the tire body that lies normally of the central rotational axis at a midway point between said axially opposing faces of the tire body; and the tire body is further characterized by one or more of the following features:

(a) the tire body is configured to undergo full radial collapse of the width dimension of each hollow cavity, at least at a narrowest point of said hollow cavity where said width dimension is at a minimum in an uncollapsed state of the hollow cavity, during movement of said cavity through a ground-contacting bottom segment of a circular rotational path of the tire around the central rotational axis;

(b) a radial measure of the outer circumference of the tire body, at non-treaded regions thereof of overlying relation to the hollow cavities, is greater at a portion of said non-treaded region that overlies said narrowest point of the hollow cavity, than at other portions of said non-treaded region that overlie wider portions of the hollow cavity; and (c) said hollow cavities of said circular array all reside at a same radial distance from the central rotational axis, and said circular array is a sole circular array of such cavities of elongated cross-section.

According to a third aspect of the invention, there is provided a non-pneumatic tire usable on a wheeled tower of an in-field irrigation system, said tire comprising a resiliently radially-compressible tire body having an outer circumference spanning circumferentially around a central rotational axis on which said tire body is rotatable; wherein the outer circumference of the tire body has sloped areas, at each of which a radial measure of the tire body decreases in an axially inward direction moving toward an axial center of the tire body, said sloped areas including first and second sets of sloped areas whose axially inward directions are respectively measured from opposing sides of the tire body.

According to a fourth aspect of the invention, there is provided an improved method of operating an in-field irrigation system in an irrigated agricultural field, said method comprising:

using non-pneumatic tires on said irrigation system that each have tapered hollow cavities therein whose width, measured radially of the tire, is tapered in an axially inward direction toward a midplane of the tire that lies normally of a central rotational axis of the tire at a midway point between axially opposing sides of the tire;

during rolling movement of each non-pneumatic tire over the field, radially collapsing each tapered hollow cavity at a narrowest inner region thereof as said cavity moves through a ground-contacting bottom segment of a circular rotational path of the tire, and thereby squeezing accumulated mud out from the hollow cavities through open outer ends thereof at the axially opposing sides of the tire, whereby the tires perform self-cleaning of said hollow cavities.

According to a fifth aspect of the invention, there is provided an improved method of operating an in-field irrigation system in an irrigated agricultural field, said method comprising:

using non-pneumatic tires on said irrigation system that each have sloped areas on an outer circumference of the tire at which a radial measure of the tire decreases in axially inward directions moving toward an axial center of the tire body, and of which said sloped areas include first and second sets of sloped areas whose respective axially inward directions are measured from opposing sides of the tire;

during rolling movement of each non-pneumatic tire over the field, using said first and second sets of sloped areas, as they move through a ground-contacting bottom segment of a circular rotational path of the tire, to draw mud inwardly toward a midplane of the tire to self-fill the ground beneath the tire and thereby reduce excessive rut formation in the field.

BRIEF DESCRIPTION OF THE DRAWINGS

One embodiment of the invention will now be described in conjunction with the accompanying drawings in which:

FIG. 1 is an overhead plan view of a center-pivot irrigation system whose wheels are fitted with non-pneumatic tires of the present invention.

FIG. 2 is a partial side elevation view of a section of the center-pivot irrigation system of FIG. 1.

FIG. 7 is an end elevational view of the tire segment of FIG. 6.

FIG. 8 is a side elevational view of the tire segment of FIG. 6.

FIG. 9 is a top plan view of the tire segment of FIG. 6.

DETAILED DESCRIPTION

Figures 3, 4:
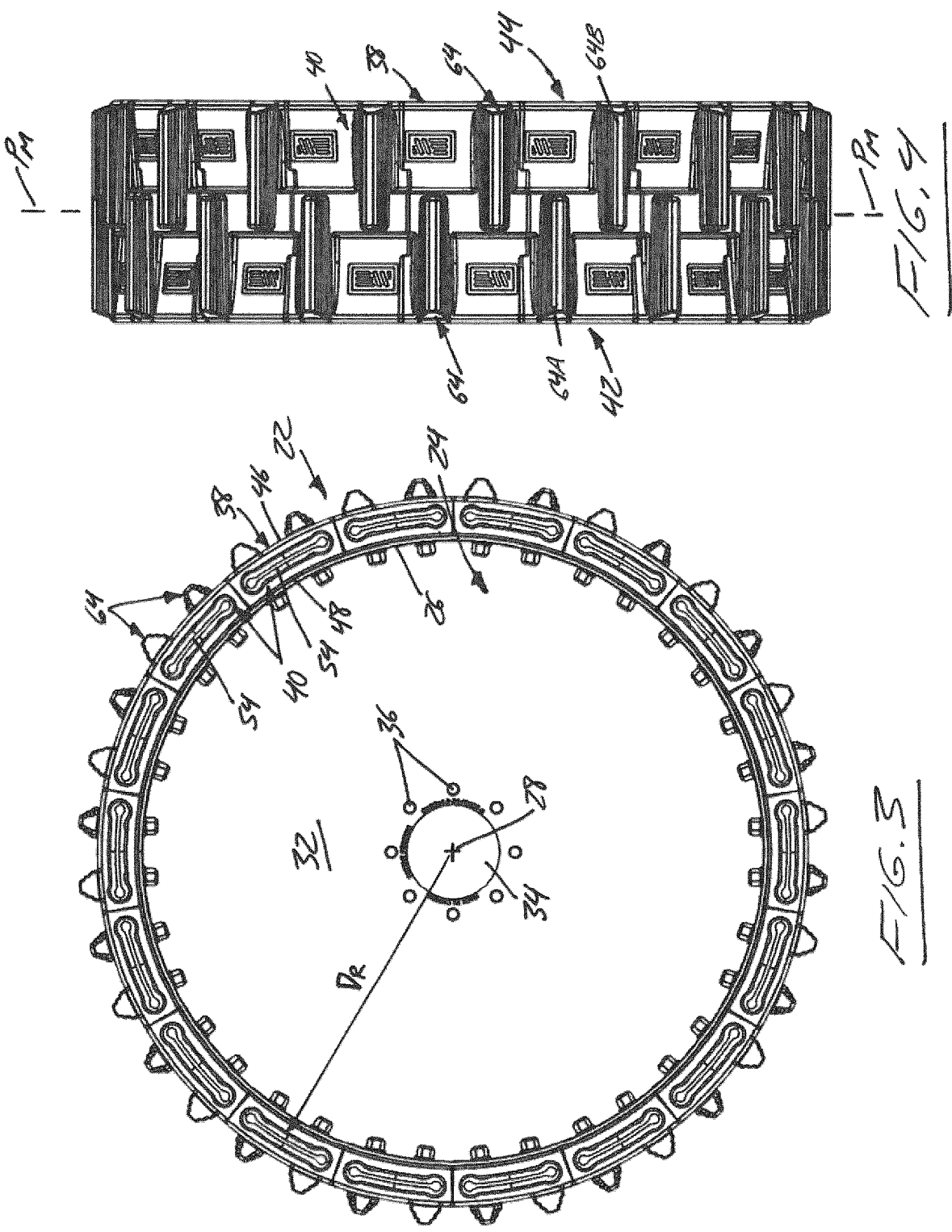
FIG. 3 is a side elevational view of a wheel fitted with a non-pneumatic tire of the present invention.
FIG. 4 is a front elevational view of the wheel of FIG. 3.

FIG. 1 shows a top plan view of self-propelled in-field irrigation system 10 for the purpose of setting the operational context of the present invention, further appreciation of which is also afforded by the elevational view in FIG. 2 of a partial section of the system 10. In a conventional manner, the irrigation system features an elevated horizontal boom 12 that is defined by a series of interconnected pipe sections sealed together end to end in a communicating manner to define a single water supply pipe. The pipe or boom 12 has a plurality of sprinklers 14 carried thereon and in communication with the interior thereof at spaced locations therealong for spraying discharge of water onto the field to be irrigated when water is fed through the pipe 12. The pipe 12 is supported above the ground G at spaced locations along the pipe 12 by a plurality of upright drive towers 16. Each tower has a pair of drive wheels 18 installed at a bottom end of the tower 16 in cooperation with a drive system to propel the drive tower 16 along the ground and thus carry water supply pipe 12 of the movable irrigation system over the field to deliver water different areas of the field. The illustrated irrigation system 10 is a center-pivot type, where one end of the elevated boom 12 is connected to a center pivot tower 20 through which the water is supplied, and around which the drive towers 16 are driven in concentric circular paths, thus sweeping the boom 12 over a circular area surrounding the center pivot tower 20.

The present invention is directed to a novel tire design for the wheels 18 of the center-pivot irrigation system 10, which may also be referred to herein more simply as an irrigator, for brevity. More specifically, the present invention is focussed primarily on a novel design for a non-pneumatic (or "airless") tire 22 of the wheel 18. Referring to the assembled wheel 18 shown in FIGS. 3 through 5, the wheel features a metal rim 24 composed a cylindrical outer drum 26 spanning concentrically around a central rotational axis 28 at a radial distance therefrom, and an inner web 32 in the form of a circular plate that is affixed to an internal surface of the outer drum 26 to occupy the internal circular area delimited thereby. The web 32 resides an axial midplane $P_M$ that bisects the outer drum 26 and lies normally (orthogonally) of the central rotational axis 28. To accommodate mounting of the wheel onto a wheel hub of an irrigator's tower-mounted drive system, the inner web 32 has a centrally located hub opening 34 that penetrates axially therethrough on the central axis 28, and a series of bolt holes 36 circularly arrayed around the hub opening 34 to enable fastening of the wheel rim 24 to the wheel hub of the drive system.

The tire 22 features an annular tire body 30 that is radially and resiliently compressible, and in the illustrated embodiment, is assembled from a plurality of identical tire segments 40 each composed of rubber or other such resiliently compressible material. The tire body 38 has two axially opposing sides 42, 44 spaced apart in the axial direction denoted by the central rotational axis 28. Each tire body segment 40 spans a respective partial circumferential distance around the central rotational axis 28 so that a convex outer surface 46 of each segment 40 defines a respective span of the overall tire body's outer circumference, while a concave inner surface 48 of each segment 40 likewise defines a respective span of the overall tire body's inner circumference. Opposing first and second sides 50, 52 of each segment face opposing circumferential directions around the central rotational axis 28 of the tire, and each lie in a respective radial plane thereof. The first side 50 of one segment thus mates with the second side 52 of a sequentially adjacent segment around the circumference of the assembled tire body.

Figure 6:
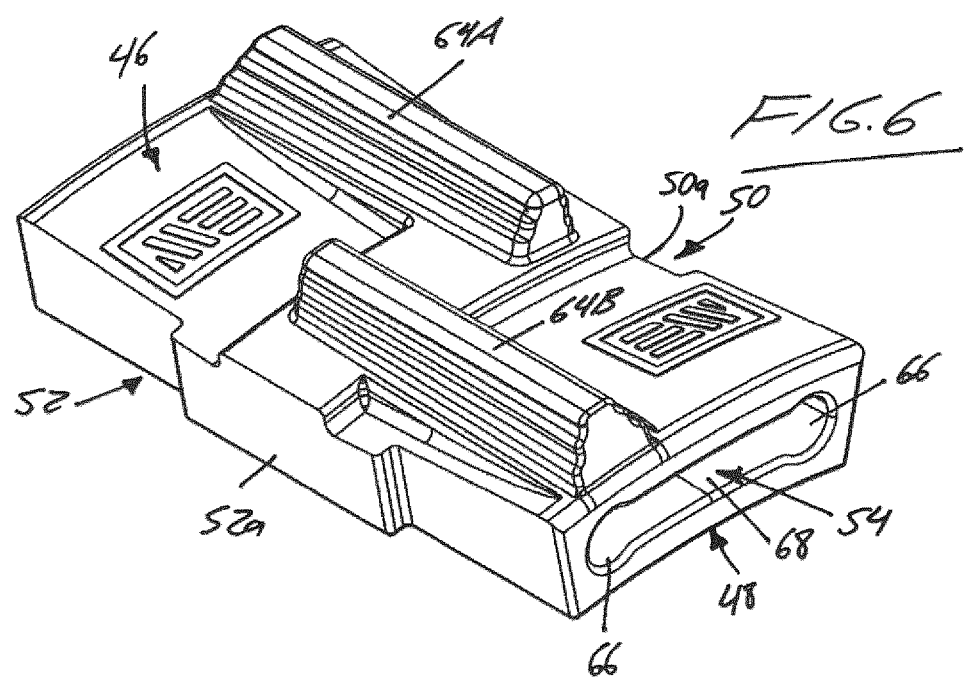
FIG. 6 is an isolated perspective view of a singular tire segment from the wheel of FIG. 3.

With reference to FIGS. 6 and 9, the two mating sides 50, 52 of the neighboring segments 40, and thus the two opposing sides of each individual segment 40, have matable male and female profiles. That is, one side 50 of each segment has a female recessed area 50A therein, while the opposing side 52 has a male protruding area 52A thereon that is sized and shaped to mate with the recessed area 50A of the adjacent segment in the assembled tire. In the illustrated embodiment, each recessed area 50A and protruding area 52A has a simple rectangular shape spanning the full radial dimension of the respective end 50, 52 of the tire segment 40 between the inner and outer surfaces 48, 46 thereof. Each recessed area 50A and protruding area 52A is centered in the axial direction of the respective segment 40 so that the male and female areas 50A, 52A mate together at the mid-plane $P_M$ of the tire and block axial separation of adjacent segments from one another in both axial directions moving outward from said mid-plane.

Each segment 40 has a singular hollow cavity 54 therein that that penetrates axially and fully through the segment 40, and is thus open at both of the two axially opposing ends of the segment 40A, 40B (i.e. at the axially opposing sides or faces 42, 44 of the tire body 38). The hollow cavities 54 are empty, and thus void of the constituent rubber material of the tire body segments 40, and thereby increase the radial compressibility of the segments compared to a solid rubber segment that would lack any such voids between the inner and outer circumference of the tire. The respective cavity 54 of each tire body segment 40 resides at a radially intermediate region of the segment that is spaced inwardly from each of the inner and outer surfaces 48, 46 thereof. Since each segment 40 has only a singular respective cavity 54 therein, and the segments 40 are all identical to one another, the assembled tire thus features a singular row of cavities 54 residing at equal radial distance DR from the central rotational axis 28. The tire thus features only one set of cavities 54 therein, characterized by their equal radial distance DR from the central rotational axis 28, and thus denoting a singular circular array of such cavities. More detail about particularly beneficial aspects of the geometry of each cavity are disclosed herein further below.

Figures 10, 11:
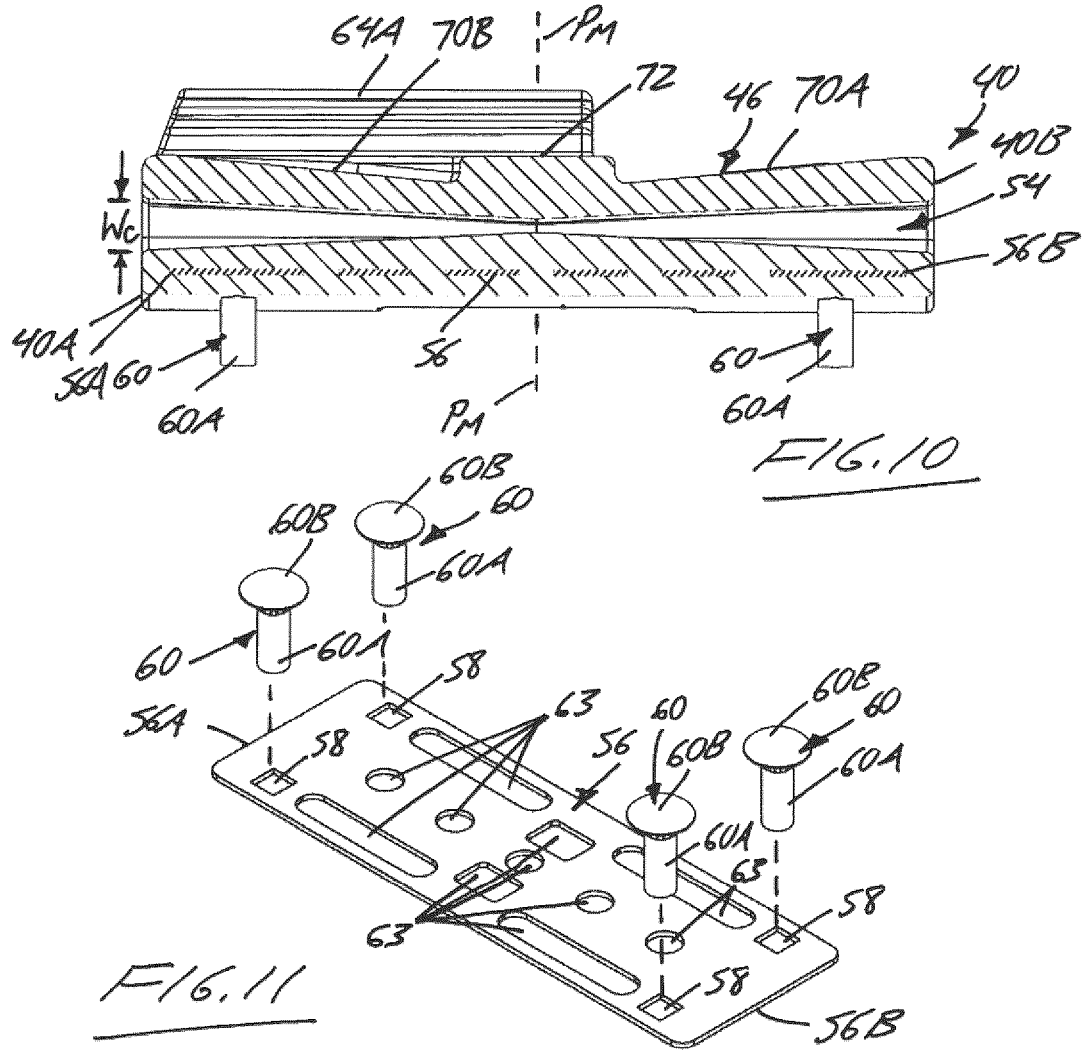
FIG. 10 is a cross-sectional view of the tire segment of FIG. 9 as taken along line A-A thereof.
FIG. 11 is an exploded perspective view of embedded mounting components from the tire segment of FIG. 10.

Embedded within the tire body 38 are mounting elements for use in securing the tire body 38 to the cylindrical outer drum 26 of the rim 24 at the outer surface thereof over which the inner circumference 28 of the tire body 38 is fitted by individual fastening of the tire body segments 40 to the outer drum 26 of the rim 24. With reference to FIGS. 10 and 11, a respective mounting plate 56 of elongated rectangular bar-shape lies axially of each segment 40 in a radially inner region thereof that is situated between the cavity-containing intermediate region and the inner surface 48 of the segment 40. A set of fastening holes or openings 58 are provided in each mounting plate 56 at respective locations near the four corners thereof at the two axially opposing ends 56a, 56b of the mounting plate 56 to accommodate a set of four threaded fasteners 60. The threaded studs or shafts 60A of these threaded fasteners 60 extend toward and through the inner surface 48 of the tire body segment 40. An enlarged head 60B of each fastener 60 resides on the outer side of the mounting plate 56 that faces toward the outer circumference of the tire. Preferably, each fastening hole 58 of the mounting plate 56 is square in shape, and each threaded fastener 60 is a carriage bolt with a square shoulder underlying the head 60B of the fastener 60. Each square hole 58 in the mounting plate 56 is sized to accommodate the square shoulder of the carriage bolt fastener 60 and constrain the carriage bolt fastener 60 against rotation.

Accordingly, rotation of the fastener 60 is not only resisted by the rubber of the tire body segment 40 that envelopes the embedded fastener head 60B and embedded portion of the fastener stud 60A, but also is blocked by the cooperative action between the straight sided mounting plate hole 58 and the mating shape of the fastener's flat-sided shoulder. Each mounting plate 56 resides centrally between the male and female profiled sides 50, 52 of the respective tire body segment 40 in the circumferential direction of the tire body. The rim 24 features an array of holes passing radially through the outer drum 26 of the rim. These holes in the rim are arranged in sets of matching hole quantity and hole layout to the respective sets of fasteners 60 in the tire segments 40. Each mounting plate 56 may have the fasteners 60 pre-welded thereto, whereby the welded-together plate and fasteners form a pre-assembled mounting unit that's embedded into each tire segment during molded production thereof. Each such mounting unit and may be sandblasted and pre-coated with a bonding agent before being molded into its embedded position anchored within the hardened rubber of the finished tire segment 40.

In addition to the surrounded state of the fully embedded mounting plate 56 by the surrounding rubber of the tire segment 40, further mechanical anchoring of each mounting plate 56 in place within the respective segment 40 may be achieved by inclusion of mould-through openings 63 in the mounting plate. During the moulding process, the flowable rubber thus not only surrounds each mounting plate 56 on all sides thereof, but also passes through each mounting plate via the mould-through openings 63 therein. Once the rubber is hardened, this further anchors the mounting plate 56 and affixed fasteners 60 in place within the tire segment. This mechanical anchoring is further reinforced by the chemically-formed bond between the hardened rubber and the coated mounting plate. In the illustrated embodiment, multiple mould-through openings 63 of various shapes are defined in the plate at various locations spread across and along the plate, but it will be appreciated that the quantity, location(s) and shape(s) of the mould-through opening(s) may vary.

Figure 5:
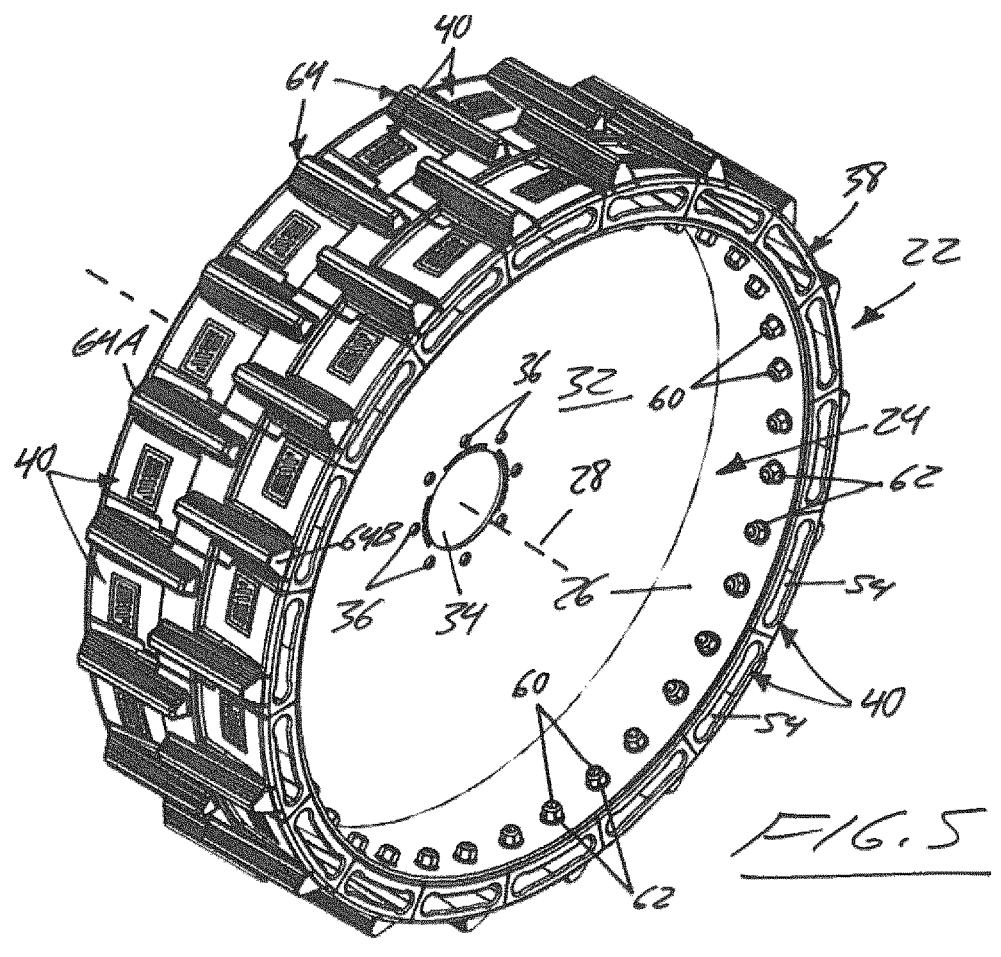
FIG. 5 is a perspective view of the wheel of FIG. 3.

To assemble the illustrated tire of FIGS. 3-5, a user places each segment 40 individually onto the outer drum 26 of the rim 24 in order to seat the inner surface 48 of the segment 40 on the convex outer surface of the rim's cylindrical drum 26, and thereby inserts the four fastener studs 60A of that segment 40 through a respective set of holes in the outer drum 26 of the rim 24. At this point, locknuts 62 are threaded onto the free ends of the fastener studs 60A and tightened up against the interior of the rim's outer drum 26, thereby securing the tire body segment 40 in place on the rim 24. This process is repeated until all the tire body segments 40 are secured in place, thereby collectively forming the overall tire body 38 that now fully spans around the rim 24 to define a completed wheel that is ready for mounting to the wheel hub of a pivot irrigator's drive tower 16. With the female recessed area 50A of each segment 40 spanning the full radial dimension of the segment's first side 50 up to the outer surface 46 thereof, the male and female profiles of the segment sides 50, 52 form slidably matable tongues and grooves that allow radial sliding of each segment into place beside the previously installed segment.

The tire body 38 features integrally-moulded rubber tread ribs 64 at spaced positions around the outer circumference of the tire body to form an outer tread of the tire that is of raised relation to all other non-treaded areas of the tire's outer circumference. In other words, the tread ribs 64 are of further radial extent from the central rotational axis 28 than the remaining non-treaded areas of the tire's outer circumference. Each tread rib 64 is elongated in the axial direction of the tire, and each segment 40 features two such ribs 64A, 64B. The ribs 64 are laid out in a staggered pattern, in which sequentially adjacent tread ribs 64 around the outer circumference of the tire body 38 alternate between a first position residing adjacent the first side 42 of the tire body 38 and a second position residing adjacent the second side 44 of the tire body 38. Accordingly, the two tread ribs 64 of each segment 40 originate at the opposing ends 40, 40B of the segment 40 so as to reside adjacent the opposing sides 42, 44 of the tire body 38 in the tire's assembled state. Each rib 64 slightly crosses the mid-plane $P_M$ of the tire body, but terminates well short of the opposing side of the tire body 38, preferably spanning less than a quarter of the other half of the tire's axial width.

One particularly unique feature of the inventive tire 22 is the purposefully novel shape and geometry of the cavities 54. In cross-sectional planes that lie normally (orthogonally) of the central rotational axis 28, and parallel to the midplane $P_M$, each cavity 54 has a circumferentially elongated cross-sectional profile. Referring to FIG. 7, a length dimension $L_C$ of the cavity's cross-sectional profile is measured in a direction of circumferential relationship to the central rotational axis 28. This cavity length $L_C$ exceeds a lesser width dimension $W_C$ of the cavity profile that is measured in a direction of radial relationship to the central rotational axis 28. This circumferentially elongated cross-sectional profile of each cavity 54, at opposing ends thereof that resides oppositely of one another in the cavity length dimension $L_C$, terminates in concavely rounded terminuses 66 that are of bulbous relation to a central lengthwise region 68 of the cavity 54 that spans between the concavely and bulbously rounded terminuses 66. In any given cross-sectional plane of the tire, the cavity width $W_C$ is greater at a widest point of each of the bulbously rounded terminuses 66 than it is at the central lengthwise region 68, throughout which the cavity width $W_C$ is uniform in said any given cross-sectional plane. As can be visually appreciated from the figures, the cross-sectional profile of each cavity 54 is thus dumbbell shaped, as can be seen from either end 40A, 40B of each tire segment 40 (i.e. from either side 42, 44 of the tire 22).

Each cavity has this dumbbell-shaped profile at each cross-sectional plane through the full axial width of the tire. However, the cross-sectional area of the dumbbell-shaped profile is not uniform throughout the axial width of the tire, particularly owing to a variability in the cavity width $W_C$ among the different cross-sectional planes. More specifically, the cavity width $W_C$ is tapered in an axially inward direction from each of the two ends 40A, 40B of the segment 40 (i.e. from each of the two sides 42, 44 of the tire 22) toward the midplane $P_M$ of the tire. The cavity width $W_C$ of each tapered cavity 54 is thus at a minimum at the tire's midplane $P_M$. This tapering of the cavity width $W_C$ in symmetric fashion from each end of the tire segment toward a minimum cavity width AT the midplane $P_M$, is best shown in the cross-sectioned segment 40 of FIG. 10, where the segment has been cross-sectioned in a plane of radial, not orthogonal, relation to the rotational axis 28 of the tire 22. It can be seen that the cavity width $W_C$, while at its minimum at the midplane $P_M$ of the tire, is at its greatest at the two axially opposing ends 40A, 40B of the segment, i.e. at each of two axially opposing faces or sides 42, 44 of the assembled tire body 38. Specifically purposeful benefits of this tapered cavity width, and the bulbously rounded ends of the dumbbell-shaped cavity profile, are detailed herein further below in relation to rolling movement of the tire during operation of an in-field irrigator 10 on which tires of this novel design are installed.

The concave inner surface 48 of each tire segment 40 has a uniform arcuate profile for flush seating thereof against the corresponding arcuate curvature of the outer surface of the wheel rim's outer drum 26. The convex outer surface 46, at non-treaded areas thereof between the raised tread ribs 64A, 64B is not of uniform profile however, and instead features variation in terms of the surface's radial measure from the center-point of its convex curvature, which coincides with the rotational axis 28 of the wheel. Tread rib 64A of each tire segment 40 is referred to as a first tread rib 64A that resides nearest to a first side 50 of the tread segment 40, and the other tread rib 64B is thus referred to as a second tread rib 6B that resides nearest to an opposing second side 52 of the tread segment 40. Each tire segment 40 has a first sloped area 70A that, in the circumferential direction of the tire 22, spans from the first side 50 of the tire segment 40 to the second tread rib 64B, and a second sloped area 70B that spans from the second side 52 of the tire segment to the first tread rib 64A. In the axial direction of the tire 22, each sloped area 70A, 70B spans toward the midplane $P_M$ from a respective one of the segment's two opposing ends 40A, 40B, and more particularly from the same end 40A, 40B thereof adjacent to which the respective tread rib 64A, 64B resides. So, the first sloped area 70A spans toward the midplane $P_M$ from a same first end 40A of the tire segment 40 as the first tread rib 64A, but stops short of the midplane, unlike the first tread rib 64A that spans a short distance past the midplane. Likewise, the second sloped area 70B spans toward the midplane $P_M$ from a same second end 40B of the tire segment 40 as the second tread rib 64B, but stops short of the midplane, unlike the second tread rib 64B that spans a short distance past the midplane.

From the rotational axis 28, the radial measure of the outer surface 46 of the tire segment 40 at each of the sloped areas 70A, 70B thereof decreases, at a linear slope, in the axially inward direction toward the midplane $P_M$. In the circumferential direction of the tire, the radial measure of the sloped areas 70A, 70B is uniform in each cross-sectional plane lying orthogonally of the central rotational axis 28, thus imparting an arcuately curved profile to each sloped area in such cross-sectional planes. The first and second sloped areas 70A, 70B have the same angle of slope, and are separated from one another by a raised central area 72 of the tire's outer surface 46 that spans fully from the first side 50 of the segment 40 to the opposing second side 52 thereof. The radial measure the segment's outer surface 46 from the rotational axis 28 is less at the raised central area 72 than at the even more greatly raised tread ribs 64A, 64B, but is greater at the raised central area 72 than at the neighbouring inner end regions of the sloped areas 70A, 70B that resides immediately adjacent the central area 72 on opposing sides thereof.

In the assembled state of the tire, the raised central areas 72 of the tire segments 40 thus cooperatively form a singular circumferential rib of the tire that spans around the full circumference thereof in an axially-central location at the tire's midplane $P_M$. In the assembled state of the tire, the first sloped areas 70A of the segments 40 all reside on a first half of the tire's axial width between the first tread ribs 64A on that same first half of the tire, and the second sloped areas 70B of the segments 40 all reside on a second half of the tire's axial width between the second tread ribs 64B that occupy that same second half of the tire. The radial measure of the tire's outer circumference at the raised central area 72 is uniform across a substantial entirety of its axial width, as is the radial measure of the outermost tip of each tread rib 64A, 64B, though each tread rib 64A, 64B may terminate with an obliquely sloped outer end 80 of steep angle near the respective 40A, 40B end of the segment 40, rather than a hard right angle, as best shown in FIG. 8.

In the illustrated example, each tread rib 64A, 64B is offset a short distance from the nearest respective side 50, 52 of the tire segment 40. The first end 50 includes a first sloped end portion 74A that spans from the first end 40A of the tire segment 40 to the raised central area 72, and at which the radial measure of the outer surface 46 of the segment slopes in matching profile to the second sloped area 70B that resides across the first tread rib 64A from this first sloped end portion 74A. In the assembled state of two adjacent tire segments 40, the first sloped end portion 74A of one segment aligns and fits in mating fashion with the second sloped area 70B of the other segment, whereby a substantial entirety of the space between the first tread ribs 64A of the two segments is of the sloped profile of reducing radial measure in the axially inward direction toward the midplane $P_M$. Likewise, the second end 52 of each tire segment 40 includes a second sloped end portion 74B that spans from the second end 40B of the tire segment 40 to the raised central area 72, and at which the radial measure of the outer surface 46 slopes in matching fashion to the first sloped area 70A that resides across the second tread rib 64B from this second sloped end portion 74B. In the assembled state of two adjacent tire segments 40, the second sloped end portion 74B of one segment aligns and fits in mating fashion with the first sloped area 70A of the other segment, whereby a substantial entirety of the space between the second tread ribs 64B of the two segments is of the sloped profile of reducing radial measure in the axially inward direction toward the midplane $P_M$.

The raised central areas 72 of the tire segments 40, and the resulting centered circumferential rib of the assembled tire, occupy an axial mid-zone of the tire that straddles the midplane $P_M$ at which the narrowest point of each hollow cavity 54 also resides. In other words, the axial midpoint of each cavity at which the cavity width $W_C$ is at its minimum coincides with the raised central area 72 of the respective tire segment, which overlies this narrowest midpoint of the cavity 54. In a default uncompressed state of each tire segment 40, in which the respective hollow cavity 54 therein is uncollapsed, this minimum cavity width $W_C$ at the cavity's axial midpoint has a non-zero value, meaning that the cavity remains open at this axial midpoint. During rolling movement of each non-pneumatic tire of the center-pivot irrigator 10 over the field, the tire segments 40 sequentially move through a lowermost ground-contacting point of a circular rotational path of the tire, i.e. move through a point of under-center relation to the rotational axis 28.

During each tire segment's movement through this lowermost under-center point of the tire's rotational path, the tire segment 40 is pressed into engagement with the ground under the exerted weight of the irrigator 10, and the relatively narrow tread ribs 64A, 64B sink into the ground surface. Among the untreaded areas of the segment's outer surface 46 that are unoccupied by the discretely spaced tread ribs 64A, 64B, the raised central area 72 is pressed against the ground before the radially lesser inner end regions of the sloped areas 70A, 70B between the treads, whereby the weight of the irrigator is initially concentrated on the raised central area 72. This concentrated exertion of the irrigator's weight on the raised central area 72 causes full radial collapse of the hollow cavity 54 specifically at the narrow axial midpoint thereof where the cavity width $W_C$ was previously at a default non-zero minimum. This radial collapse of the hollow cavity down to a zero width (i.e. full radial closure) at its axial midpoint triggers a middle-out squeezing action, where field mud that may have accumulated within the cavity 54 is squeezed outwardly away from the collapsed cavity midpoint, and is thus ejected outwardly through the open ends of the cavity at the opposing sides 42, 44 of the tire 32. The uniquely designed tire segments 40 are thus self-cleaning due to this squeezed ejection of accumulated mud from the segment cavities as they move through the under-center point of the tire's rotational path. The preferred dumbbell-shaped profile imparted by the bulbously rounded ends of the otherwise narrow, circumferentially elongated slot-like cavities 54 imparts an improved wear-life to the tire segments 40 by avoiding squared-off corners at the ends of the elongate cavities 54, which may otherwise serve as premature stress-failure points under the ongoing cyclical collapse and re-expansion of the slots during rolling travel of the tires.

Meanwhile, owing to the sloped areas 70A, 70B between the tread ribs 64A, 64B, the tire also performs an automated rut-mitigation function during rolling movement of the tire segments 40 through the under-center point of the tire's rotational path. The axially and radially inward sloping angle of the sloped areas 70A, 70B serves to force field mud axially inwardly toward the midplane $P_M$ of the tire during rolling movement thereof over the ground G, rather than displacing field mud axially outward from beneath the tire. This reduces the formation or deepening of excessive ruts in the field during operation of the center-pivot irrigator 10, as these sloped areas of the tire's outer circumference serve to self-fill the area over which the tire is travelling.

While the illustrated embodiment of the non-pneumatic tire 22 is a segmented tire 22 whose tire body 38 is assembled from a plurality of discrete tire segments 40 each spanning a respective partial circumferential distance around the central rotational axis 28 of the assembled tire, it will be appreciated that the novel self-cleaning cavities 54 and strategically sloped outer circumferential areas 70A, 70B between the treads 64A, 64B may be employed to similar effect in a non-pneumatic tire of non-segmented design. Also, while the disclosed tire design is particularly beneficial for in-field irrigation systems, the same tire design may optionally be employed for other applications where similar self-cleaning and rut prevention/reduction may also be useful.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A non-pneumatic tire usable on a wheeled tower of an in-field irrigation system, said tire comprising:

a resiliently radially-compressible tire body having an outer circumference spanning circumferentially around a central rotational axis on which said tire body is rotatable; and in circumferentially distributed relation to one another around said central rotational axis at a radial distance spaced inwardly from said outer circumference of the tire body, a circular array of hollow cavities disposed within said tire body;

wherein each hollow cavity in said circular array:

penetrates axially through the tire body and terminates in open outer ends at axially opposing sides of the tire;

in cross-sectional planes lying normal to said central rotational axis, has a circumferentially elongated cross-section featuring a length dimension that is measured in a direction of circumferential relationship to the central rotational axis, and that exceeds a lesser width dimension that is measured in a direction of radial relationship to the central rotational axis;

is dumbbell shaped in said elongated cross-section, and thus characterized by bulbously and concavely rounded terminuses at opposing ends of said elongated cross-section that are interconnecting by an intervening central region of the elongated cross-section that spans between the bulbously and concavely rounded terminuses, among the intervening central region measures narrower than each of the bulbously and concavely rounded terminuses in the width dimension, and measures longer in the length dimension than each of bulbously and concavely rounded terminuses measures in each of the length and width dimensions; and is configured to undergo radial collapse at a radially narrowest part of the hollow cavity during movement of the hollow cavity through a ground-contacting under-center portion of a circular rotational path of the tire around the central rotational axis, and to thereafter radially re-expand to an uncollapsed state, and the bulbously and concavely rounded terminuses avoid creation of premature stress-failure points under ongoing cyclical collapse and re-expansion of the cavity.

2. The tire of claim 1 wherein the width dimension of each hollow cavity is greater at the open outer ends thereof at the axially opposing sides of the tire body than at a midplane of the tire body that lies normally of the central rotational axis at a midway point between said axially opposing sides of the tire body.

3. The tire of claim 2 wherein said width dimension of each hollow cavity tapers in an axially inward direction from each of the two axially opposing sides of the tire body toward the midplane thereof.

4. The tire of claim 1 wherein the width dimension of each hollow cavity is tapered in an axially inward direction toward a midplane of the tire body that lies normally of the central rotational axis at a midway point between axially opposing sides of the tire body.

5. The tire of claim 1 wherein the narrowest part of each hollow cavity resides at an axially central region thereof within which a midplane of the tire resides, and is configured to undergo full radial collapse during said movement of said hollow cavity through said ground-contacting under-center portion of said circular rotational path of the tire around the central rotational axis.

6. The tire of claim 1 wherein the outer circumference of the tire body comprises a combination of raised treads and unraised regions situated between said raised treads, among which the raised treads reach radially further from the rotational axis that said unraised regions, and a radial measure of the outer circumference of the tire body, is greater at a portion of each unraised region that overlies the narrowest part of a respective hollow cavity than at other portions of said unraised region that overlie wider portions of the respective hollow cavity.

7. The tire of claim 1 wherein said hollow cavities of circumferentially elongated cross-section in said circular array all reside at a same radial distance from the central rotational axis, and said circular array is a sole circular array of such cavities of elongated cross-section.

8. The tire of claim 1 wherein said tire body is assembled from a plurality of tire segments each spanning a respective partial circumferential distance around said central rotational axis, each segment having a respective singular one of said hollow cavities therein.

9. The tire of claim 1 in combination with a wheeled tower of an in-field irrigation system, on which said tire is installed.

10. An improved method of operating an in-field irrigation system in an irrigated agricultural field, said method comprising:

using, on said in-field irrigation system, non-pneumatic tires of the type recited in claim 4;

during rolling movement of each non-pneumatic tire over the field, radially collapsing each tapered hollow cavity at a narrowest inner region thereof as said cavity moves through a ground-contacting bottom segment of a circular rotational path of the tire, and thereby squeezing accumulated mud out from the hollow cavities through open outer ends thereof at the axially opposing sides of the tire, whereby the tires perform self-cleaning of said hollow cavities.

11. A non-pneumatic tire usable on a wheeled tower of an in-field irrigation system, said tire comprising:

a resiliently radially-compressible tire body having an outer circumference spanning circumferentially around a central rotational axis on which said tire body is rotatable; and in circumferentially distributed relation to one another around said central rotational axis at a radial distance spaced inwardly from said outer circumference of the tire body, a circular array of hollow cavities disposed within said tire body;

wherein the outer circumference of the tire body has sloped areas, at each of which a radial measure of the tire body decreases in an axially inward direction moving toward an axial center of the tire body, and of which said sloped areas include first and second sets of sloped areas whose respective axially inward directions are measured from axially opposing sides of the tire body, and whose respective slopes of decreasing radial measure respectively start at said axially opposing sides of the tire body to draw mud inwardly from said axially opposing sides of the tire body toward the axial center thereof in order to self-fill the ground beneath the tire and reduce rut formation in the field of said in-field irrigation system.

12. The tire of claim 11 wherein the outer circumference of the tire body comprises a combination of raised treads and unraised regions situated between said raised treads, among which the raised treads reach radially further from the rotational axis that said unraised regions, and each sloped area of the outer circumference occupies one of said unraised regions between two of the raised treads.

13. The tire of claim 12 where the radial measure of the tire body, at each raised tread, is uniform over at least a partial axial span of said raised tread.

14. The tire of claim 13 wherein the radial measure of the tire body, at each raised tread, is uniform over at least a majority axial span of said raised tread.

15. The tire of claim 12 wherein the raised treads are arranged in a staggered tread pattern in which sequentially adjacent treads around the outer circumference of the tire body alternate between a first position adjacent a first side of the tire body and a second position adjacent a second side of the tire body, the first set of sloped areas reside adjacent the first side of the tire between the treads that reside in the first position, and the second set of sloped areas reside adjacent the second side of the tire between the treads that reside in the second position.

16. The tire of claim 12 wherein each sloped area in the first set of sloped areas is separated from an adjacent sloped area in the second set of sloped areas by a raised central area where the radial measure of the tire body is greater than at inner ends of the sloped areas, and the respective slope of decreasing radial measure of each sloped area spans at least a majority of a shortest axial distance from one of the opposing axial sides of the tire to a radially tallest extremity of the raised central area.

17. The tire of claim 16 wherein the radial measure of the tire body at said central area is uniform across at least a majority axial span of said central area.

18. The tire of claim 16 wherein said radial measure of the tire body at said central area is uniform across an entire axial span of said central area.

19. The tire of claim 16 wherein said raised central area coincides with an axial mid-zone of the tire where the width dimension of each hollow cavity is at a minimum.

20. The tire of claim 11 wherein the respective slope of decreasing radial measure of each sloped area spans a majority of an axial distance from one of the opposing axial sides of the tire to a midplane of the tire body that lies normally of the central rotational axis at a midway point between said axially opposing sides of the tire body.

21. An improved method of operating an in-field irrigation system in an irrigated agricultural field, said method comprising:

using, on said in-field irrigation system, non-pneumatic tires of the type recited in claim 11;

during rolling movement of each non-pneumatic tire over the field, using said first and second sets of sloped areas, as they move through a ground-contacting bottom segment of a circular rotational path of the tire, to draw mud inwardly toward a midplane of the tire to self-fill the ground beneath the tire and thereby reduce excessive rut formation in the field.

\* \* \* \* \*